US012339689B2

(12) United States Patent
Weerakoon et al.

(10) Patent No.: US 12,339,689 B2
(45) Date of Patent: Jun. 24, 2025

(54) VOLTAGE REGULATOR FOR PROVIDING A STABLE OUTPUT VOLTAGE IN AN IMPLANTABLE STIMULATOR DEVICE

(71) Applicant: Boston Scientific Neuromodulation Corporation, Valencia, CA (US)

(72) Inventors: Pujitha Weerakoon, Valencia, CA (US); Goran N. Marnfeldt, Valencia, CA (US)

(73) Assignee: Boston Scientific Neuromodulation Corporation, Valencia, CA (US)

( * ) Notice: Subject to any disclaimer, the term of this patent is extended or adjusted under 35 U.S.C. 154(b) by 439 days.

(21) Appl. No.: 17/937,307

(22) Filed: Sep. 30, 2022

(65) Prior Publication Data

US 2023/0107780 A1 Apr. 6, 2023

Related U.S. Application Data

(60) Provisional application No. 63/262,173, filed on Oct. 6, 2021.

(51) Int. Cl.
*G05F 1/575* (2006.01)
*G05F 3/26* (2006.01)

(52) U.S. Cl.
CPC ................ *G05F 1/575* (2013.01); *G05F 3/26* (2013.01)

(58) Field of Classification Search
CPC .................................. G05F 1/575; G05F 3/26
See application file for complete search history.

(56) References Cited

U.S. PATENT DOCUMENTS

| | | | |
|---|---|---|---|
| 5,387,228 A | 2/1995 | Shelton | |
| 6,181,969 B1 | 1/2001 | Gord | |
| 8,606,362 B2 | 12/2013 | He et al. | |
| 8,620,436 B2 | 12/2013 | Parramon et al. | |
| 8,892,202 B2 | 11/2014 | Lin et al. | |
| 9,037,241 B2 | 5/2015 | Lamont et al. | |
| 9,259,574 B2 | 2/2016 | Aghassian et al. | |
| 10,525,252 B2 | 1/2020 | Feldman et al. | |
| 10,716,937 B2 | 7/2020 | Feldman et al. | |
| 10,792,491 B2 | 10/2020 | Feldman et al. | |
| 10,881,859 B2 | 1/2021 | Brill et al. | |
| 10,912,942 B2 | 2/2021 | Weerakoon et al. | |
| 11,040,192 B2 | 6/2021 | Weerakoon et al. | |
| 11,040,202 B2 | 6/2021 | Marnfeldt | |
| 11,429,127 B2 * | 8/2022 | Joo | G05F 1/575 |
| 2012/0092031 A1 | 4/2012 | Shi et al. | |

(Continued)

FOREIGN PATENT DOCUMENTS

WO 2021/046120 3/2021

*Primary Examiner* — Adolf D Berhane
(74) *Attorney, Agent, or Firm* — Lewis & Reese, PLLC

(57) ABSTRACT

Regulator circuitry for producing a regulated output voltage in an implantable stimulation device and associated methods are disclosed. The regulator circuitry is particularly useful where a load current drawn from the output voltage involves transients, such as occurs when the output voltage is used to power a charge pump that creates a higher power supply voltage (e.g., a compliance voltage) in the device. The output current is sampled and downscaled in the regulator, and is further mirrored and filtered. This filtered current provides a control voltage in which transients are minimized and smoothed, and which is more suitable for use as a feedback voltage when producing the output voltage.

16 Claims, 7 Drawing Sheets

(56) References Cited

U.S. PATENT DOCUMENTS

| | | | |
|---|---|---|---|
| 2012/0095519 | A1 | 4/2012 | Parramon et al. |
| 2012/0095529 | A1 | 4/2012 | Parramon et al. |
| 2013/0289665 | A1 | 10/2013 | Marnfeldt et al. |
| 2015/0080982 | A1 | 3/2015 | Funderburk |
| 2015/0157861 | A1 | 6/2015 | Aghassian |
| 2015/0360038 | A1 | 12/2015 | Zottola et al. |
| 2018/0071520 | A1 | 3/2018 | Weerakoon et al. |
| 2022/0345137 | A1* | 10/2022 | Choo .................... H03L 7/0805 |
| 2023/0248978 | A1* | 8/2023 | Weerakoon ........ A61N 1/36125 607/62 |

* cited by examiner

VOLTAGE REGULATOR FOR PROVIDING A STABLE OUTPUT VOLTAGE IN AN IMPLANTABLE STIMULATOR DEVICE

CROSS REFERENCE TO RELATED APPLICATIONS

This is a non-provisional application of U.S. Provisional Patent Application Ser. No. 63/262,173, filed Oct. 6, 2021, to which priority is claimed, and which is incorporated herein by reference in its entirety.

FIELD OF THE INVENTION

This application relates generally to voltage regulator circuitry. More specifically, it relates to Implantable Medical Devices (IMDs), and use of voltage regulator circuitry to power a boosting circuit for creating a compliance voltage that powers stimulation circuitry.

INTRODUCTION

Implantable neurostimulator devices are devices that generate and deliver electrical stimuli to body nerves and tissues for the therapy of various biological disorders, such as pacemakers to treat cardiac arrhythmia, defibrillators to treat cardiac fibrillation, cochlear stimulators to treat deafness, retinal stimulators to treat blindness, muscle stimulators to produce coordinated limb movement, peripheral nerve stimulators, spinal cord stimulators (SCS) to treat chronic pain, cortical and deep brain stimulators (DBS) to treat motor and psychological disorders, and other neural stimulators to treat urinary incontinence, sleep apnea, shoulder subluxation, etc.

A stimulator system typically includes an Implantable Pulse Generator (IPG) 10 shown in FIG. 1. The IPG 10 includes a biocompatible device case 12 that holds the circuitry and a battery 14 for providing power for the IPG to function. The IPG 10 is coupled to tissue-stimulating electrodes 16 via one or more electrode leads that form an electrode array 17. For example, one or more percutaneous leads 15 can be used having ring-shaped or split-ring electrodes 16 carried on a flexible body 18. In another example, a paddle lead 19 provides electrodes 16 positioned on one of its generally flat surfaces. Lead wires 20 within the leads are coupled to the electrodes 16 and to proximal contacts 21 insertable into lead connectors 22 fixed in a header 23 on the IPG 10, which header can comprise an epoxy for example. Once inserted, the proximal contacts 21 connect to header contacts 24 within the lead connectors 22, which are in turn coupled by feedthrough pins 25 through a case feedthrough 26 to stimulation circuitry 28 within the case 12.

In the illustrated IPG 10, there are thirty-two electrodes (E1-E32), split between four percutaneous leads 15, or contained on a single paddle lead 19, and thus the header 23 may include a 2×2 array of eight-electrode lead connectors 22. However, the type and number of leads, and the number of electrodes, in an IPG is application specific and therefore can vary. The conductive case 12, or some conductive portion of the case, can also comprise an electrode (Ec). In an SCS application, the electrode lead(s) are typically implanted in the spinal column proximate to the dura in a patient's spinal cord, preferably spanning left and right of the patient's spinal column. The proximal contacts 21 are tunneled through the patient's tissue to a distant location such as the buttocks where the IPG case 12 is implanted, at which point they are coupled to the lead connectors 22. In a DBS application, the electrode leads are implanted in the brain through holes in the skull, and lead extension are used to connect the leads to the IPG which is typically implanted under the clavicle (collarbone). In other IPG examples designed for implantation directly at a site requiring stimulation, the IPG can be lead-less, having electrodes 16 instead appearing on the body of the IPG 10 for contacting the patient's tissue. The IPG lead(s) can be integrated with and permanently connected to the IPG 10 in other solutions. SCS therapy can relieve symptoms such as chronic back pain, while DBS therapy can alleviate Parkinsonian symptoms such as tremor and rigidity.

IPG 10 can include an antenna 27*a* allowing it to communicate bi-directionally with a number of external devices. Antenna 27*a* as shown comprises a conductive coil within the case 12, although the coil antenna 27*a* can also appear in the header 23. When antenna 27*a* is configured as a coil, communication with external devices preferably occurs using near-field magnetic induction. IPG 10 may also include a Radio-Frequency (RF) antenna 27*b*. In FIG. 1, RF antenna 27*b* is shown within the header 23, but it may also be within the case 12. RF antenna 27*b* may comprise a patch, slot, or wire, and may operate as a monopole or dipole. RF antenna 27*b* preferably communicates using far-field electromagnetic waves, and may operate in accordance with any number of known RF communication standards, such as Bluetooth, Zigbee, WiFi, MICS, and the like. External devices with which the IPG 10 can communicate include clinician programmers and patient remote controllers, which are described in further details in U.S. Patent Application Publications 2015/0080982 and 2015/0360038. Such external devices are useful to program and monitor the IPG 10.

Stimulation in IPG 10 is typically provided by pulses each of which may include a number of phases (30*i*), as shown in the example of FIG. 2A. Stimulation parameters typically include amplitude (current I, although a voltage amplitude V can also be used); frequency (F); pulse width (PW); the electrodes 16 selected to provide the stimulation; and the polarity of such selected electrodes, i.e., whether they act as anodes that source current to the tissue or cathodes that sink current from the tissue. These and possibly other stimulation parameters taken together comprise a stimulation program that the stimulation circuitry 28 in the IPG 10 can execute to provide therapeutic stimulation to a patient.

In the example of FIG. 2A, electrode E1 has been selected as an anode (during its first phase 30*a*), and thus provides pulses which source a positive current of amplitude +I to the tissue. Electrode E2 has been selected as a cathode (again during first phase 30*a*), and thus provides pulses which sink a corresponding negative current of amplitude −I from the tissue. This is an example of bipolar stimulation, in which the lead includes one anode pole and one cathode pole. Note that more than one electrode on the lead may be selected to act as an anode electrode to form an anode pole at a given time, and more than one electrode may be selected to act as a cathode to form a cathode pole at a given time, as explained further in U.S. Pat. No. 10,881,859. Stimulation provided by the IPG 10 can also be monopolar, in which the lead is programmed with a single pole of a given polarity (e.g., a cathode pole), with the conductive case electrode Ec acting as a return (e.g., an anode pole). Again, more than one electrode on the lead may be active to form the pole during monopolar stimulation.

IPG 10 as mentioned includes stimulation circuitry 28 to form prescribed stimulation at a patient's tissue. Stimulation circuitry 28 may also be include in an External Trial Stimulator (ETS; not shown), which can be used externally to provide stimulation during a trial phase and prior to implantation of an IPG, as explained in U.S. Pat. No. 9,259,574, which is incorporated herein by reference. (IPG as used herein should be understood as including an ETS).

FIG. 3 shows an example of stimulation circuitry 28, which includes one or more current source circuits and one or more current sink circuits. The sources and sinks can comprise Digital-to-Analog converters (DACs), and may be referred to as PDACs and NDACs in accordance with the Positive (sourced, anodic) and Negative (sunk, cathodic) currents they respectively issue. In the example shown, a NDACi/PDACi pair is dedicated (hardwired) to a particular electrode node ei 39.

Each electrode node ei 39 is connected to an electrode Ei 16 via a DC-blocking capacitor Ci 38, which act as a safety measure to prevent DC current injection into the patient, as could occur for example if there is a circuit fault in the stimulation circuitry 28. Because these DC blocking capacitors can charge during, biphasic pulses can be used, with each pulse comprising a first phase 30*a* followed thereafter by a second phase 30*b* of opposite polarity, as shown in FIG. 2A. Biphasic pulses are useful to actively recover any charge that might be stored on capacitive elements in the electrode current paths, such as on the DC-blocking capacitors 38. This is illustrated in FIG. 2A, which shows voltages forming on capacitors C1 and C2 (Vc1 and Vc2) as a result of charge storage during the first phase 30*a*, and the active removal of that charge during the second phase 30*b*. If active charge recovery is not perfect (i.e., Vc1 and Vc2 are not exactly zero at the end of the second phase 30*b*), passive charge recovery can be used as well. This occurs during periods 30*c*, and is affected by closing passive recovery switches PR1, PR2, etc., as shown in FIG. 3. Passive charge recovery is explained further in U.S. Pat. Nos. 10,716,937 and 10,792,491. The on-resistance of the passive recovery switches can be controlled to affect the speed at which passive charge recovery occurs, as explained in the '937 and '491 patents. Note that the common voltage Vpr used during passive charge recovery can comprise ground, VH, VH/2, the voltage of the battery 14 (Vbat), or any other DC voltage provided by the IPG 10, and any number of generator circuits (not shown) can be used to produce these voltages for Vpr. The DC-blocking capacitors 38 are typically provided off-chip (off of the ASIC(s) as explained below), and instead may be provided in or on a circuit board in the IPG 10 used to integrate its various components, as explained in U.S. Patent Application Publication 2015/0157861.

Proper control of the PDACs and NDACs allows any of the electrodes 16 (including the case electrode Ec 12) to be selected to act as anodes or cathodes to create a current through a patient's tissue, R, hopefully with good therapeutic effect. Consistent with the example provided in FIG. 2A, FIG. 3 shows operation during the first phase 30*a* in which electrode E1 has been selected as an anode electrode to source current I to the tissue R and E2 has been selected as a cathode electrode to sink current from the tissue. Thus PDAC1 and NDAC2 are digitally programmed to produce the desired current, I, with the correct timing (e.g., in accordance with the prescribed frequency and pulse widths). As mentioned above, more than one anode electrode and more than one cathode electrode may be selected at one time, and thus current can flow through the tissue R between two or more of the electrodes 16.

Other stimulation circuitries 28 can also be used in the IPG 10. In an example not shown, a switching matrix can intervene between the one or more PDACs and the electrode nodes ei 39, and between the one or more NDACs and the electrode nodes. Switching matrices allows one or more of the PDACs or one or more of the NDACs to be connected to one or more anode electrode nodes at a given time, and to allow any PDAC or NDAC to be connected to any of the electrode nodes. Various examples of stimulation circuitries can be found in U.S. Pat. Nos. 6,181,969, 8,606,362, 8,620,436, 11,040,192, and 10,912,942. Much of the stimulation circuitry 28 of FIG. 3, including the PDACs and NDACs, the switch matrices (if present), and the electrode nodes ei 39 can be integrated on one or more Application Specific Integrated Circuits (ASICs), as described in U.S. Patent Application Publications 2012/0095529, 2012/0092031, and 2012/0095519. As explained in these references, ASIC(s) may also contain other circuitry useful in the IPG 10, such as IPG master control circuitry, telemetry circuitry (for interfacing off chip with telemetry antennas 27*a* and/or 27*b*), circuitry for generating the compliance voltage VH (as explained next), various measurement circuits, etc.

Power for the stimulation circuitry 28 is provided by a compliance voltage VH, as described in further detail in U.S. Patent Application Publications 2013/0289665 and 2018/0071520. The compliance voltage VH may be coupled to the source circuitry (e.g., the PDAC(s)), while ground may be coupled to the sink circuitry (e.g., the NDAC(s)), such that the stimulation circuitry 28 is powered by VH and ground. Other power supply voltages may be used with the PDACs and NDACs, and explained in the '520 Publication, but these aren't shown in FIG. 3 for simplicity.

Preferably, the compliance voltage VH can be produced by a boosting circuit 53. Boosting circuit 53 can comprise an inductor-based boost converter or a capacitor-based charge pump, as explained in U.S. Pat. No. 11,040,202. The boosting circuit 53 can vary the value of VH based on measurements taken from the stimulation circuitry 28. As explained in detail in the '202 patent, VH measurement circuitry 51 can be used to deduce the voltage drops across the active DACs (e.g., PDAC1 (Vp1) and NDAC2 (Vn2) in the example shown in FIG. 3) in the stimulation circuitry 28, and to issue one or more control signals 47 to enable operation of the boosting circuit 53 and to set the value of VH. Control signal(s) 47 allow VH to be established at an energy-efficient level: high enough to form the prescribed current without loading (i.e., without producing less current that prescribed), yet low enough to not needlessly waste power in the stimulation circuitry 28 when forming the prescribed current. Control signal(s) 47 can comprise an enable signal or interrupt signal, which when asserted can enable the boosting circuit to increase VH, and when deasserted can allow VH to fall, as described in U.S. Pat. No. 10,525,252, which is incorporated by reference in its entirety. Control signals 47 can alternatively, or additionally, comprise control signals to set the boosting circuitry 53 to output VH at a particular value, as described in Int'l (PCT) Patent Application Publication WO 2021/046120, which is incorporated by reference in its entirety.

SUMMARY

Circuitry is disclosed for providing a regulated output voltage from a first voltage, which mat comprise: an output branch comprising at least one output transistor coupled to the first voltage and outputting the regulated output voltage, wherein the at least one output transistor passes an output current; a first branch and a second branch each comprising at least one control transistor coupled to the first voltage; first feedback circuitry configured to set a first current in the first branch, wherein the first current comprises the output current scaled by a scalar; current mirror circuitry configured to mirror the first current as a second current in the second branch; filter circuitry configured to filter transients from the second current compared to first current; and second feedback circuitry configured to drive the at least one output transistor and the at least one control transistors in the first and second branches, wherein the second feedback circuitry comprises a first input coupled to a reference voltage and a second input coupled to the second branch.

In one example, the circuitry may further comprise one or more loads powered by the output voltage and configured to draw a load current from the output voltage. In one example, at least one of the loads comprises a boosting circuit for producing a power supply voltage from the output voltage. In one example, the circuitry further comprising stimulation circuitry in a stimulator device, wherein the power supply voltage is configured to power the stimulation circuitry. In one example, the circuitry further comprises a current source configured to draw a bias current from the output voltage. In one example, the output current comprises a sum of the bias current and the load current. In one example, the first feedback circuitry comprises a first input connected to the output voltage, and a second input connected to an output of the control transistor in the first branch. In one example, the first branch comprises a feedback transistor, wherein an output of the first feedback circuitry controls the feedback transistor. In one example, the current mirror circuitry comprises current mirror transistors in the first and second branches having a common gate connected to the first branch. In one example, the filter circuitry is connected to the common gate connection. In one example, the scalar is set by an effective width of the at least one output transistor relative to a width of the control transistors. In one example, the at least one output transistor comprises a plurality of transistors connected in parallel. In one example, the first voltage is provided by a battery. In one example, the output voltage comprises a function of the reference voltage. In one example, the circuitry further comprises a first resistance and a second resistance, wherein the output voltage comprises a function of the reference voltage, the first resistance and the second resistance. In one example, the output voltage equals the reference voltage. In one example, the first and second feedback circuitries each comprise at least one amplifier.

A method is disclosed for providing a regulated output voltage from a first voltage, which may comprise: outputting from at least one output transistor coupled to the first voltage the regulated output voltage, wherein the at least one output transistor passes an output current; producing a filtered current in a filter branch comprising at least one control transistor coupled to the first voltage, wherein the filtered current comprises a scaled and filtered version of the output current, wherein the filter branch comprises a filtered voltage; and using the filtered voltage to control the at least one output transistor and the at least one control transistor.

In one example, producing the filtered current comprises: producing a sampled current in a sample branch comprising at least one control transistor coupled to the first voltage; mirroring the sampled current to the filtered branch; and filtering transients from the filtered current compared to sampled current. In one example, the filtered voltage is used to control the at least one output transistor and the at least one control transistor in the filter and sample branches. In one example, using the filtered voltage to control the at least one output transistor and the at least one control transistor comprises inputting the filtered voltage to a first input feedback circuitry, wherein an output of the feedback circuitry controls the at least one output transistor and the at least one control transistor. In one example, a reference voltage is input to a second input of the feedback circuitry. In one example, the output voltage comprises a function of the reference voltage. In one example, the output voltage comprises a function of the reference voltage, a first resistance and a second resistance. In one example, the output voltage equals the reference voltage. In one example, the method further comprises powering one or more loads using the output voltage, wherein the one or more loads draw a load current from the output voltage. In one example, at least one of the loads comprises a boosting circuit. In one example, the method further comprises producing a power supply voltage from the output voltage using the boosting circuit. In one example, the power supply voltage is used to power stimulation circuitry in a stimulator device. In one example, the method further comprises drawing a bias current from the output voltage. In one example, the output current comprises a sum of the bias current and the load current. In one example, the filtered current is scaled by setting an effective width of the at least one output transistor relative to an effective width of the at least one control transistor. In one example, the at least one output transistor comprises a plurality of transistors connected in parallel. In one example, the first voltage is provided by a battery.

DETAILED DESCRIPTION

Figure 4:
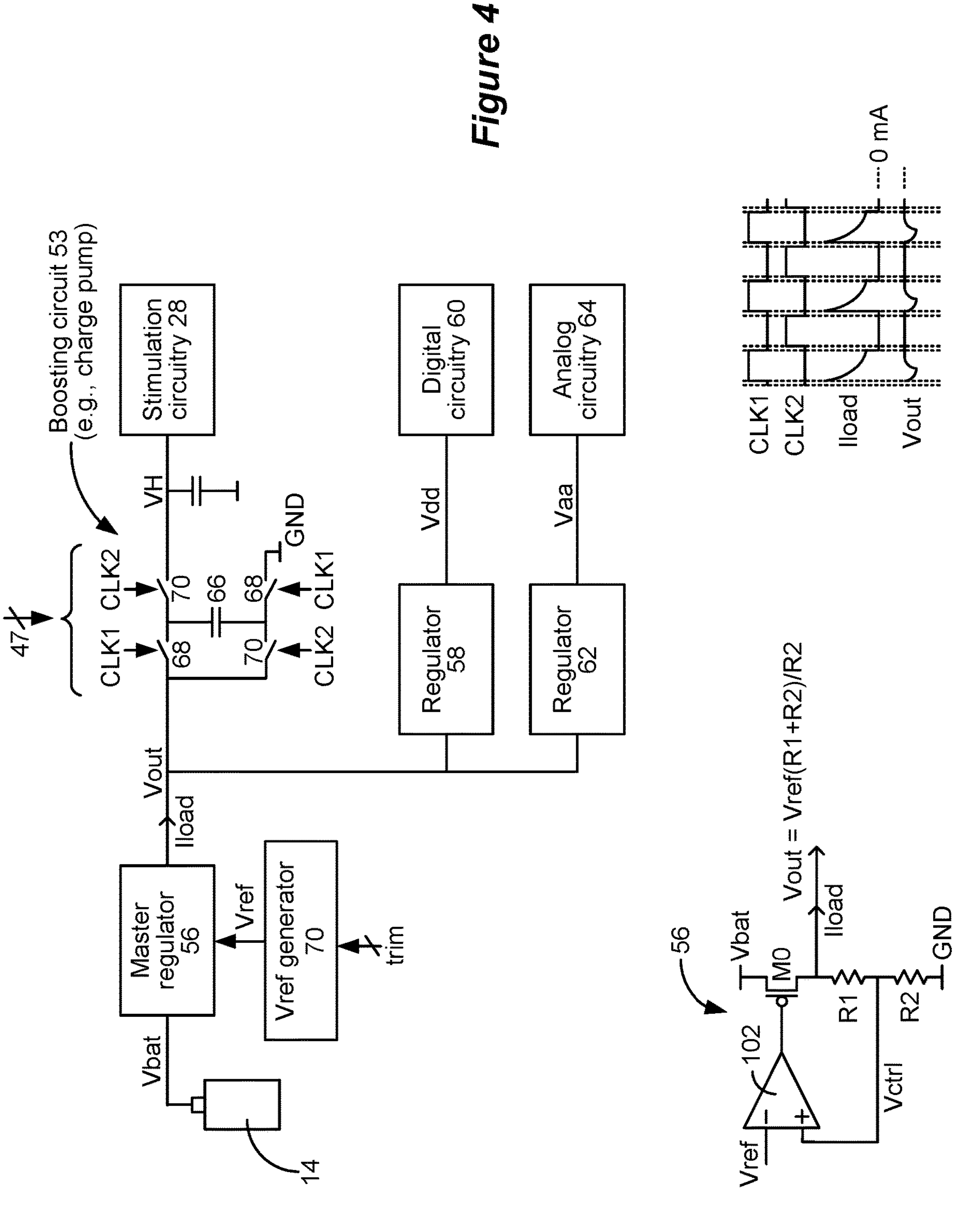
FIG. 4 shows an overview of the power distribution circuitry in the IPG, including use of a master regulator, in accordance with the prior art.

FIG. 4 shows further details concerning power distribution in the IPG 10. As described earlier, the IPG 10 includes a battery 14, which can either be a rechargeable battery or a primary (non-rechargeable battery). This battery outputs a battery voltage, Vbat. Many other voltages can ultimately be generated from Vbat in the IPG 10, including various power supply voltages such as those discussed further below.

Because Vbat can vary, Vbat can be regulated before being used to generate other power supplies or other useful voltages in the IPG 10. For example, a master voltage regulator 56 can be used to generate a regulated voltage, Vout, from Vbat. Ideally, Vout comprises a constant voltage that is unaffected by the various loads it powers in the IPG 10, but this is not always the case as explained further below. The value of Vout may be controlled by a reference voltage, Vref, provided by a Vref generator 70. Vref (and hence Vout) may be temperature invariant, and in this regard Vref generator 70 may comprise a band gap generator for example. The value of Vref provided by Vref generator 70 may be adjusted in accordance with control signals (trim), as is known in the art. Use of master regulator 56 is preferable to provide isolation between the battery 14 (Vbat) and the various loads in the IPG 10.

Master regulator 56 can comprise any number of known circuits to generate a constant value of Vout from Vbat. FIG. 4 shows a simple example for master regulator 56 which includes a differential amplifier (diff amp) 102 and an output transistor M0. A negative input of the diff amp is connected to Vref (from Vref generator 70), and its output is provided to a gate of an output transistor M0 that is connected to Vbat at its source. The drain of transistor M0 provides Vout to downstream circuitry. A resistor ladder formed by resistors R1 and R2 creates provides a control voltage, Vctrl, to the positive input of the diff amp 102. Feedback forces this positive input to equal the negative input Vref, and so Vout is ideally set to Vref(R1+R2)/R2 in this example. In other examples of master regulator 56, Vout could be set as a different function of Vref, or could be set equal to Vref.

Vout may be further regulated before it used by other downstream circuits. For example, a first regulator 58 can be used to generate a power supply voltage Vdd from Vout for powering digital circuitry 60 operating within the IPG 100. Vdd may comprise 1.8V in one example. A second regulator 62 can be used to generate a power supply voltage Vaa from Vout for powering analog circuitry 64 operating within the IPG 100. Vaa may comprise 3.3V in one example. See, e.g., U.S. Pat. No. 9,037,241, which is incorporated by reference in its entirety, describing various analog 64 and digital 60 circuits within an IPG 10. Regulators 58 and 62 can comprise well-known Low Drop Out (LDO) regulators and the like, and the IPG 10 may include still other regulators and power supply voltages not shown in FIG. 4.

Figure 1:
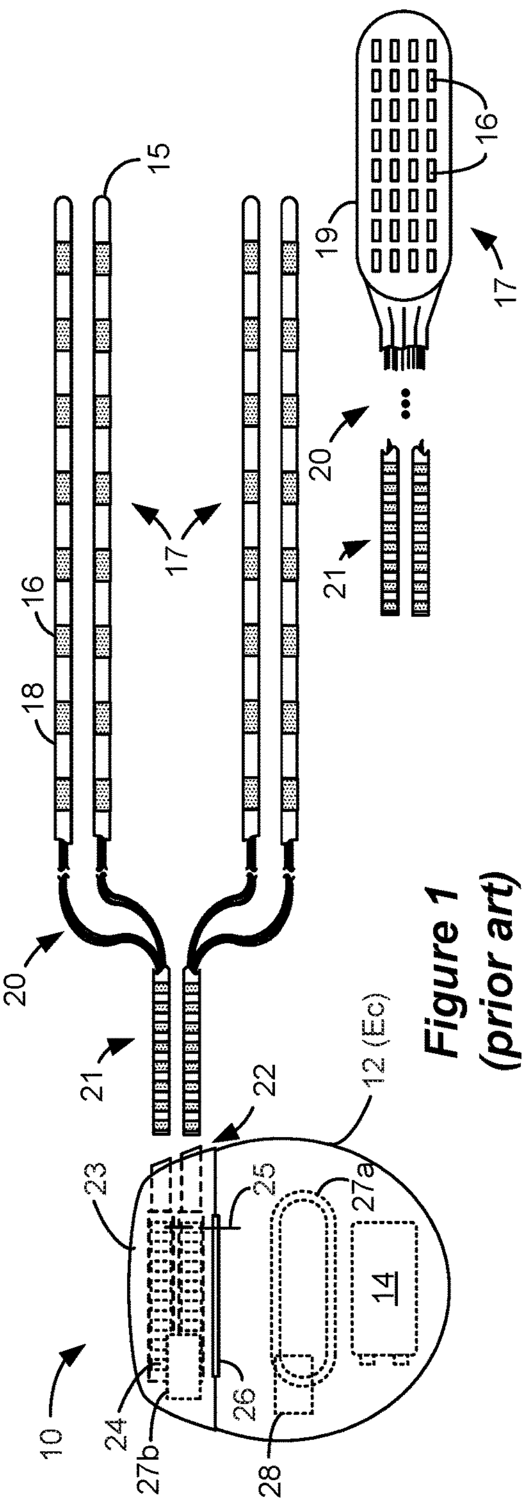
Figure 1 (prior art)
FIG. 1 shows an Implantable Pulse Generator (IPG), in accordance with the prior art.
Figure 2A:
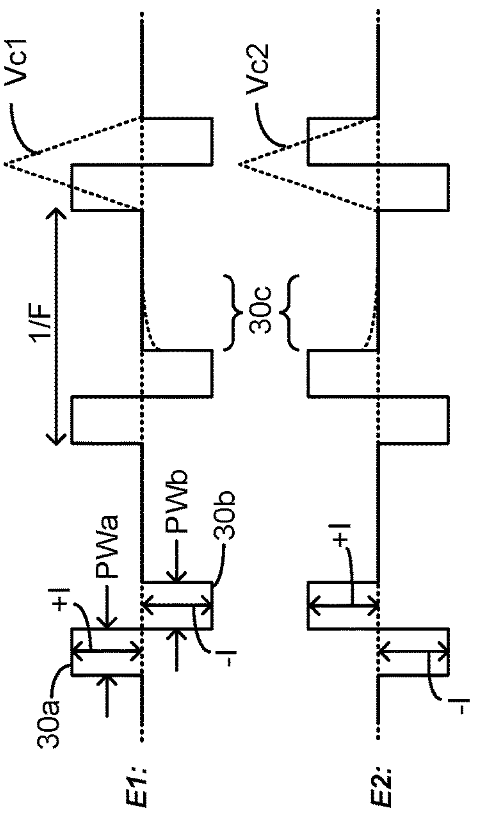
Figure 2A (prior art)
FIGS. 2A and 2B show an example of stimulation pulses producible by the IPG, in accordance with the prior art.
Figure 2B:
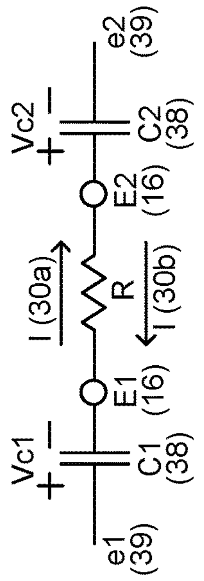
Figure 2B (prior art)
Figure 3:
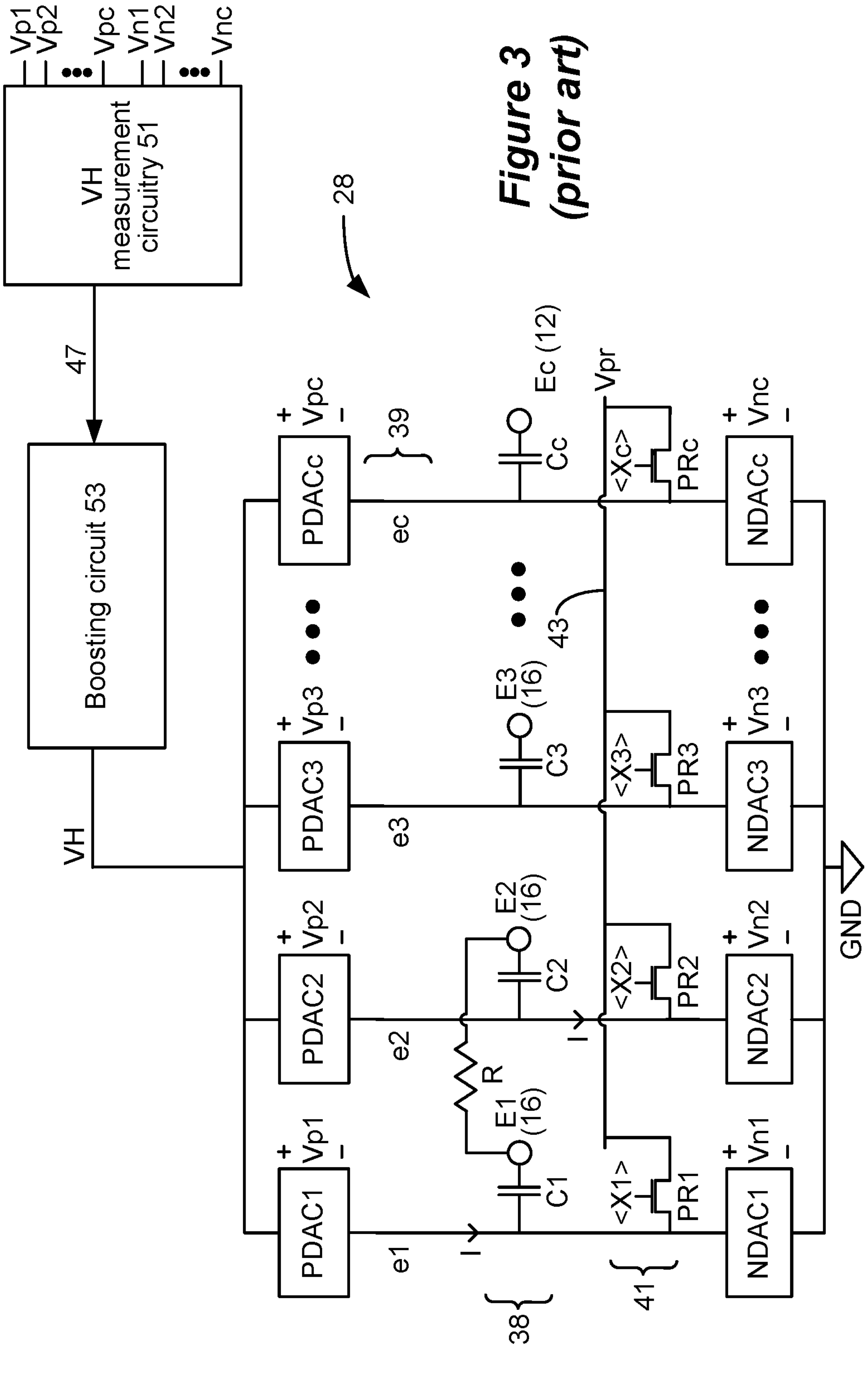
Figure 3 (prior art)
FIG. 3 shows stimulation circuitry useable in the IPG, in accordance with the prior art.

FIG. 4 also shows the boosting circuitry 53 used to generate the compliance voltage VH power supply for the stimulation circuitry 28. As described earlier with reference to FIG. 3, the boosting circuitry 53 can comprise an inductor-based boost converter, or as shown a capacitor-based charge pump, to boost the input voltage (in this case Vout) to VH. As described earlier, the boosting circuitry 53 can vary the value of VH depending on control signals 47. VH may vary for example between 5 to 15 Volts.

A charge pump may include one more capacitors 66 and a number of switches 68, 70 that are opened and closed in accordance with interleaved clock signals (e.g., CLK1 and CLK2). A complicated charge pump design capable of producing a multitude of values for the compliance voltage VH is disclosed in Int'l (PCT) Patent Application Publication WO 2021/046120, which is incorporated herein by reference. However, FIG. 4 here illustrates only a simple charge pump 66, namely a "doubler," which is able to produce VH at twice the value of the input voltage, i.e., VH=2Vout. One skilled will understand how this is achieved. During a charging phase (CLK1 asserted), switches 68 are closed, which impresses Vout across capacitor 66. During a booting phase (CLK2 asserted), switches 70 are closed. This connects the bottom plate of capacitor 66 to Vout and the top plate to the compliance voltage VH. Because Vout was previously stored on the capacitor 66, the new reference of Vout on the bottom plate causes the top plate to equal 2Vout at VH. Again, this is just a simple example of how a charge pump 53 can produce VH from an input voltage of Vout. Other more complicated examples such as those disclosed in the '120 Publication allow VH to be produced at different ratios of Vout.

The charge pump in FIG. 4 illustrates a problem related to stability. During the charging phase (CLK1), a transient surge of current flows through the capacitor 66, because the voltage across it suddenly changes (i.e., I=C*dV/dt). This transient is shown in the waveforms in FIG. 4, and is evidenced by the current Iload drawn from the output of the master regulator 56. More complicated charge pumps would involve similar transients in Iload. Because the master regulator 56's feedback mechanism can't react quickly enough to this sudden change, Vout starts to fall from its optimal value as set by Vref and resistor values R1 and R2. Once the transient current through the capacitor 66 becomes small enough, and is changing slowly enough, the master regulator 56's feedback mechanism is suitable to supply Iload without Vout loading, and Vout increases back to its optimal value. Although not shown, an inductor-based boost converter when used for boosting circuitry 53 will also cause current transients, and thus can similarly destabilized Vout.

The effect of the current transient during the charging phase (CLK1) is made worse because in the intervening boosting phases (CLK2), the current drawn by the charge pump 53 from the master regulator 56 is essentially zero. This makes the sudden current transients during the charging phases (CLK1) that much more difficult for the master regulator 56 to quickly handle.

In short, downstream circuitry such as the boosting circuit 53 can destabilize the output Vout of the master regulator 56. This creates problems both for operation of the boosting circuit 53, as well as for other regulators such as 58 and 62 to which Vout is input. Said simply, if Vout is not well regulated and varies from its optimal value, downstream voltages such as VH, Vdd, and Vaa may also not be well regulated and may also vary, thus affecting operation of circuits (28, 60, and 64) that those downstream voltages power.

The inventors have therefore devised an improved regulator circuit 100, which is able to handle output current transients while still maintaining Vout at a more-constant level. The improved regulator circuit 100 is preferably used for the master regulator 56 in FIG. 4, but it could alternatively or additionally be used for other regulators circuits as well (such as 58 and 62). Furthermore, while developed in the context of an IPG, the improved regulator circuit 100 can be used in other contexts as well, and essentially in any application where stable voltage regulation is needed even when extreme current transients are present at the output.

Figure 5:
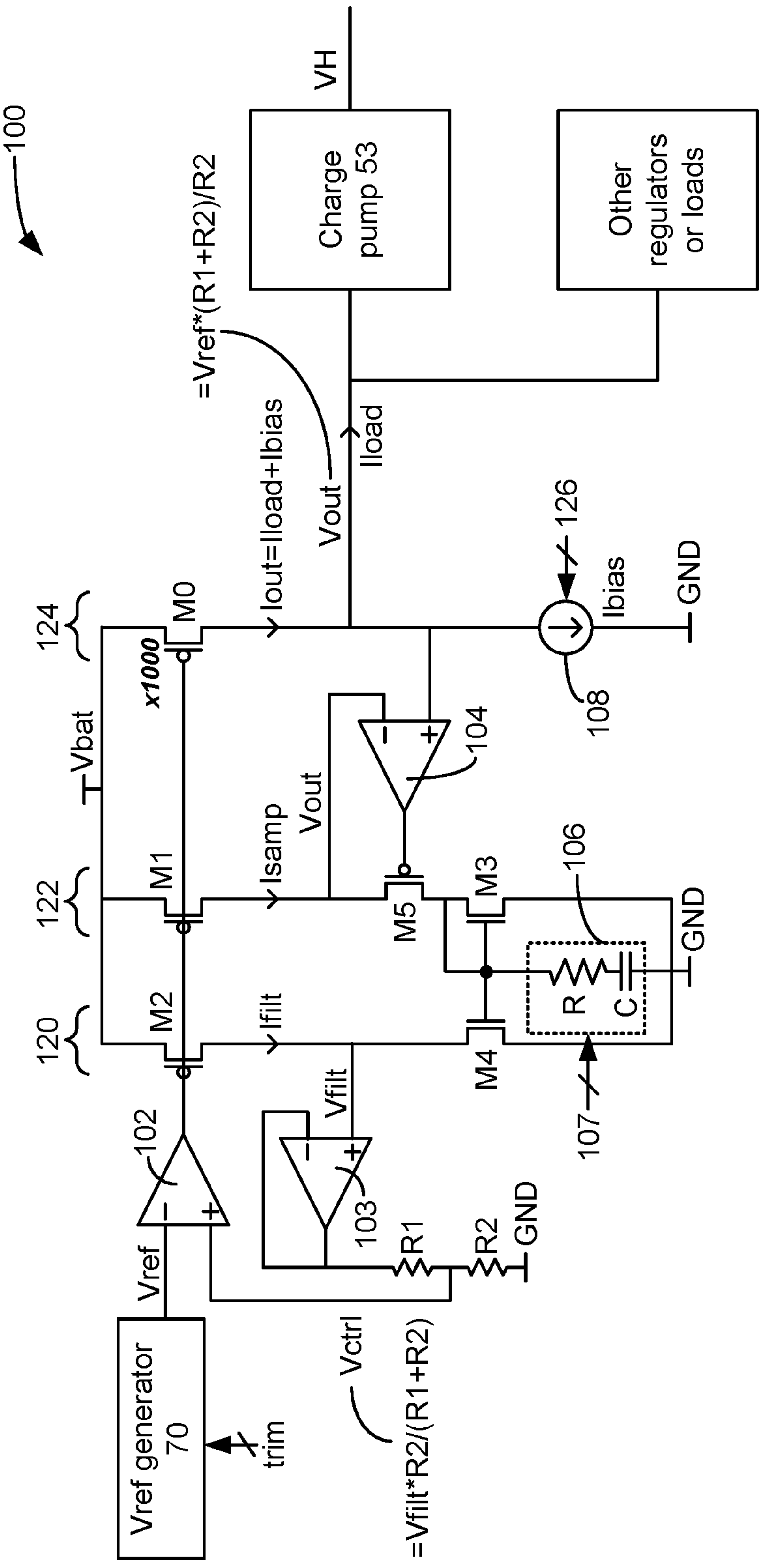
FIGS. 5-7 show different examples of master regulator circuits having improved stability, in accordance with examples of the invention.

FIG. 5 shows a first example of the improved regulator circuit 100, which outputs a voltage Vout with improved stability. The value of Vout is set in this example in accordance a reference voltage, Vref, and resistors R1 and R2. Like the master regulator 56 described earlier (FIG. 4), Vout is ideally set to Vref*(R1+R2)/R2. However, Vout may also be set to Vref, and resistors R1 and R2 aren't strictly required, as discussed later with reference to FIG. 7. Vref as described earlier may be temperature-invariant, and its magnitude may be adjustable by control signals (trim, FIG. 5). As shown, the regulator 100 is preferably powered by the battery voltage, Vbat, but another power supply voltage could be used as well.

Vref is provided to the negative input of diff amp 102, similarly tpo what occurred in the master regulator 56 of FIG. 4. The positive input to diff amp 102 comprises a control voltage, Vctrl. This control voltage Vctrl is formed as a function of a filtered feedback voltage, Vfilt, that develops in branch 120, as explained further below. Branch 120 comprises a serial connection of two transistors: control transistor M2 and current mirror transistor M4. Another branch 122 comprises a serial connection of control transistor M1, feedback transistor M5, and current mirror transistor M3. Notice that transistors M3 and M4 are connected in a current mirror configuration, with their gates connected, and with this common gate connection also connected to the source of transistor M3. This means that the current that forms in branch 122 (Isamp) through transistors M1, M5, and M3 will also generally form in branch 120 (Ifilt) through transistors M2 and M4. However, as explained further below, Ifilt comprises a low-pass filtered version of Isamp.

The output of diff amp 102 is connected to the gates of M2, M1, and at least one output transistor M0 in an output branch 124 responsible for producing Vout and Iout at its drain. The sources of M2, M1, and M0 are connected to the power supply, such as Vbat, although again another power supply voltage could be used as well. Preferably, M0 is scaled in size with respect to transistors M1 and M2 in a known manner, and such scaling can be affected in a number of different ways. For example, M0 may comprise a single transistor whose width is 1000 times larger than the widths of transistors M1 and M2. Alternatively, M0 can comprise 1000 transistors similar in size to those used for M1 and M2, but wired in parallel (which is essentially equivalent to a single wider transistor). A scalar of 1000 is chosen in this example, but a different value for the scalar could also be set (including 1).

Figure 8:
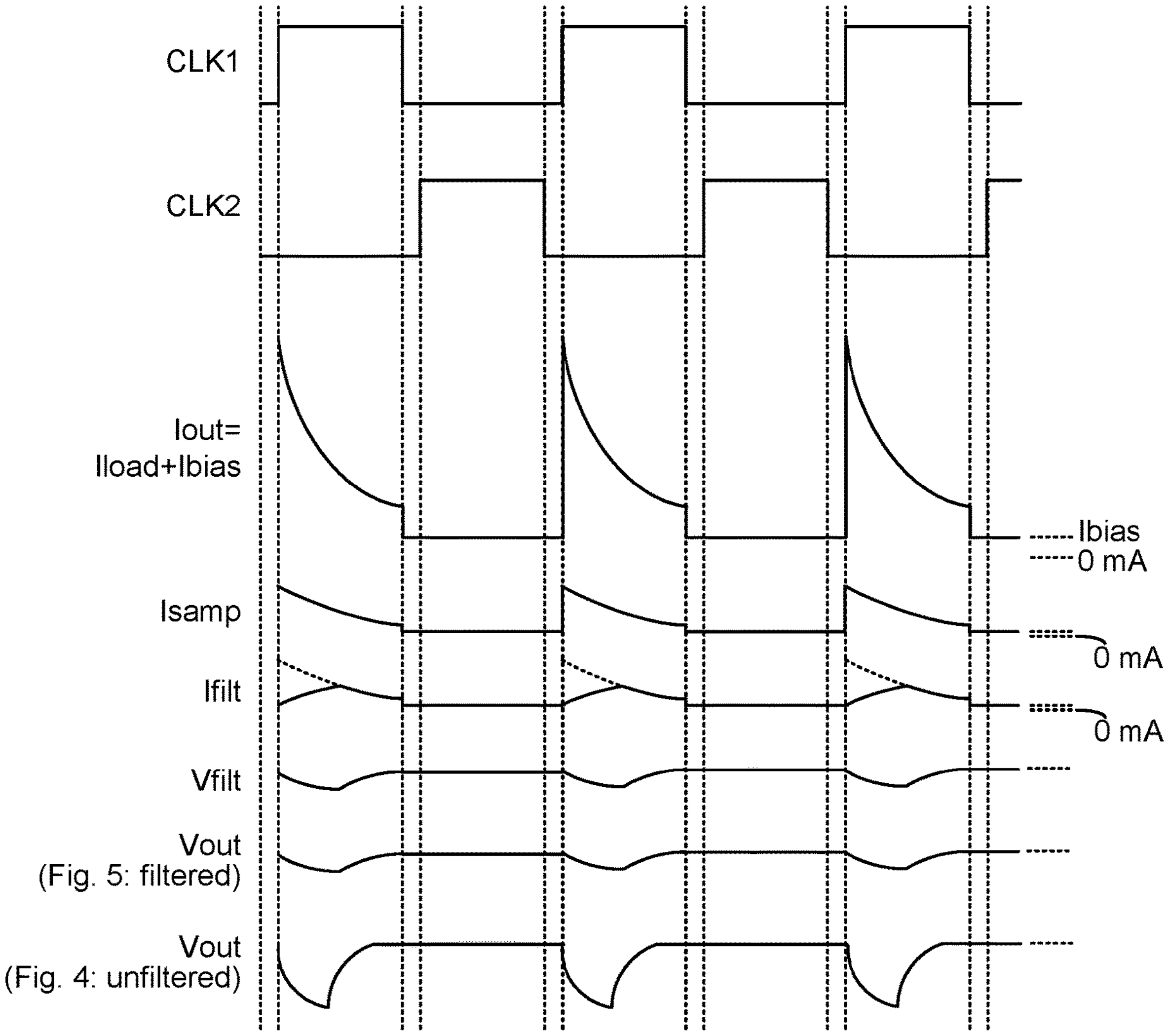
FIG. 8 shows waveforms used or produced in the improved master regulator circuit of FIG. 5.

This scaling helps to set the value of the currents in branches 122 and 120. First, note that Vout at the drain of M0 is provided to the positive input of a diff amp 104. Diff amp 104's output is connected to the gate of transistor M5 in branch 122, which together comprise feedback circuitry, although such feedback can be achieved in other ways. The negative input of diff amp 104 is connected to the drain of transistor M1 in branch 122. Feedback causes Vout present at the positive input to be reflected at the negative input connected to the drain of transistor M1. As such, the drain-to-source voltage drop is held the same (Vbat-Vout) across M1 and M0. Because of this, and because M1 and M0 are controlled equally by their common gate connection, the current formed in branch 122, Isamp, will scale in accordance with the difference in the effective widths between M0 and M1. The current flowing through M0 comprises Iout, which equals Iload drawn by downstream circuitry (e.g., charge pump 53, etc.), plus Ibias provided by a current source 108. (Ibias and current source 108 are discussed further below). The current Isamp in branch 122 is therefore set to one one-thousandth of this value. In other words, Isamp=0.001 (Iload+Ibais), and is so named because it comprises a scaled-down sample of Iout. Illustration of Iout and Isamp are shown in FIG. 8 with reference to the charging (CLK1) and boosting (CLK2) phases of downstream charge pump as explained earlier. While Isamp is merely a scaled-down version of Iout, this scaling is not necessarily shown to scale in FIG. 8.

As explained above, Ifilt in branch 120 is generally formed (by virtue of the current mirror transistors M3 and M4) as a mirrored version of Isamp in branch 122, although it is filtered by a low pass filter 106. This low pass filter 106 in one example comprises a serial connection of a resistor R and capacitor C, which is connected between the common-gate connection of M3/M4 and ground. The low pass filter 106 smooths transients in Isamp (resulting from the transients in Iload and therefore Iout) and in particular smooths the voltage on the common-gate connection of M3/M4. As a result, Ifilt in branch 120 varies more slowly than Isamp in branch 122, as shown in FIG. 8. The degree to which Ifilt is filtered depends on the RC time constant set by the values of resistor R and capacitor C, as one skilled in the art understands. This RC time constant—i.e., the values of R and/or C—may be adjusted by one or more time constant control signals 107.

Ifilt causes Vfilt to be formed at the node between transistors M2 and M4 in branch 120. Vfilt, as shown in FIG. 8, varies on the same time scale as Ifilt, and so is similarly low-pass filtered and lacking in fast-acting transients. In this regard, and compared to the master regulator 56 shown in FIG. 4, Vfilt can be understood as a filtered version of Vout: i.e., Vfilt is more stable and does not vary as quickly as Vout. Vfilt is used to form a control voltage Vctrl as a function of Vfilt, and this occurs using diff amp 103 and resistors R1 and R2, as one skilled in the art will understand. Specifically, Vctrl equals Vfilt*R2/(R1+R2), and so Vctrl like Vfilt is also filtered. Control voltage Vctrl is provided to the positive input of diff amp 102. Because Vctrl does not vary so quickly, Vout produced is more stable, and does not deviate as significantly from its prescribed value as shown in FIG. 8. Less-stable Vout as produced from the master regulator 56 of FIG. 4 is also shown in FIG. 8 for comparison. Diff amps 102 and 103 (and resistors R1 and R2 if used) stated simply generally comprise feedback circuitry, although other examples are possible.

Referring again to FIG. 5, the regulator circuit 100 preferably has a current source 108 which causes a constant current Ibias to be drawn from Vout. The value of Ibias may be programmable using control signals 126. The current source 108 is useful to keep the circuitry 100 biased and ready to handle transients even when no or little current Iload is being drawn by the loads—such as during the boosting phases (CLK2) discussed earlier. Providing this current bias provides at least a small voltage at the positive input of diff amp 104, which also causes keeps small (scaled) currents flowing in branches 120 and 122. See FIG. 8, Isamp and Ifilt during CLK 2. As such, the circuitry is kept "warm," and able to handle transients more quickly, thus improving the regulation of Vout.

Figure 6:
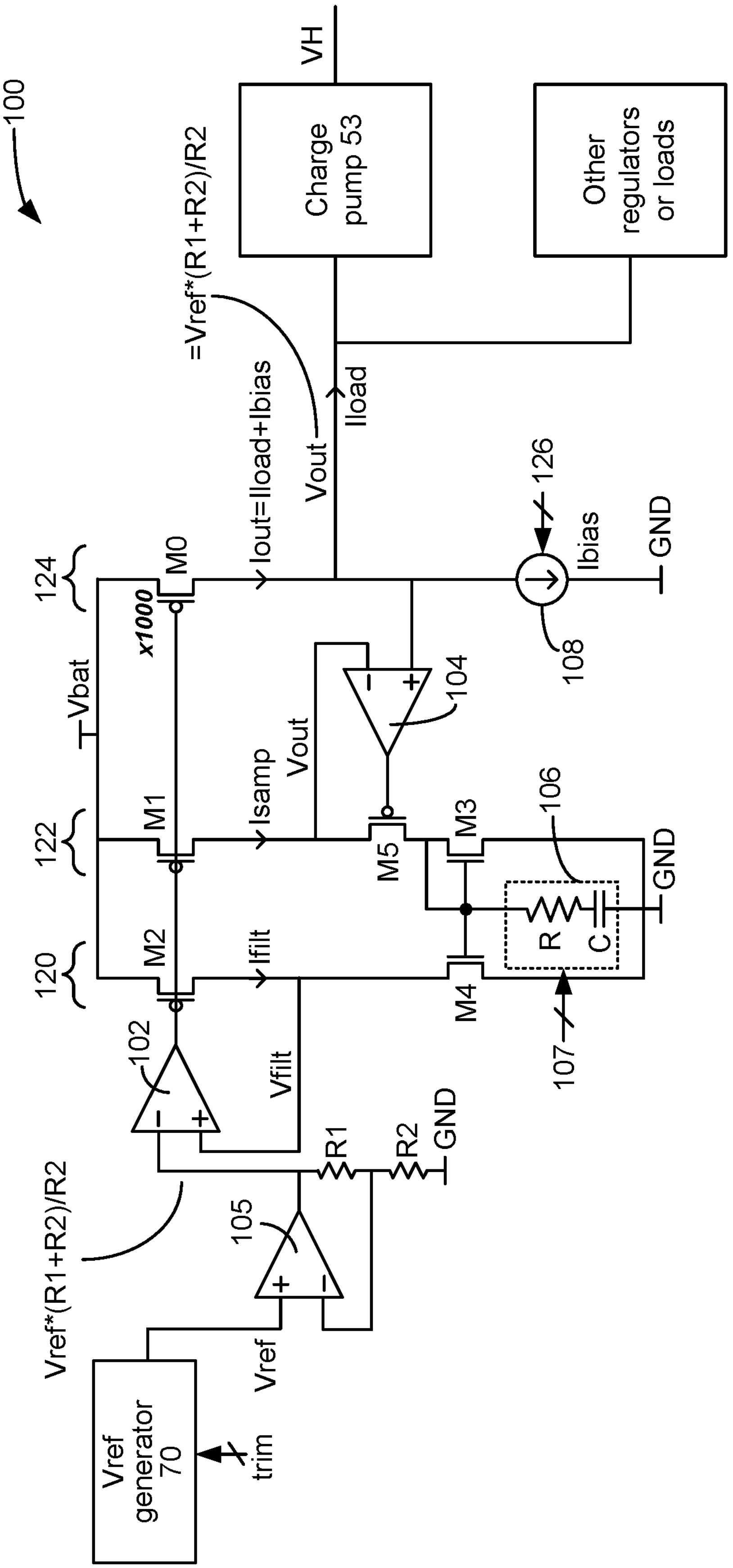
Figure 7:
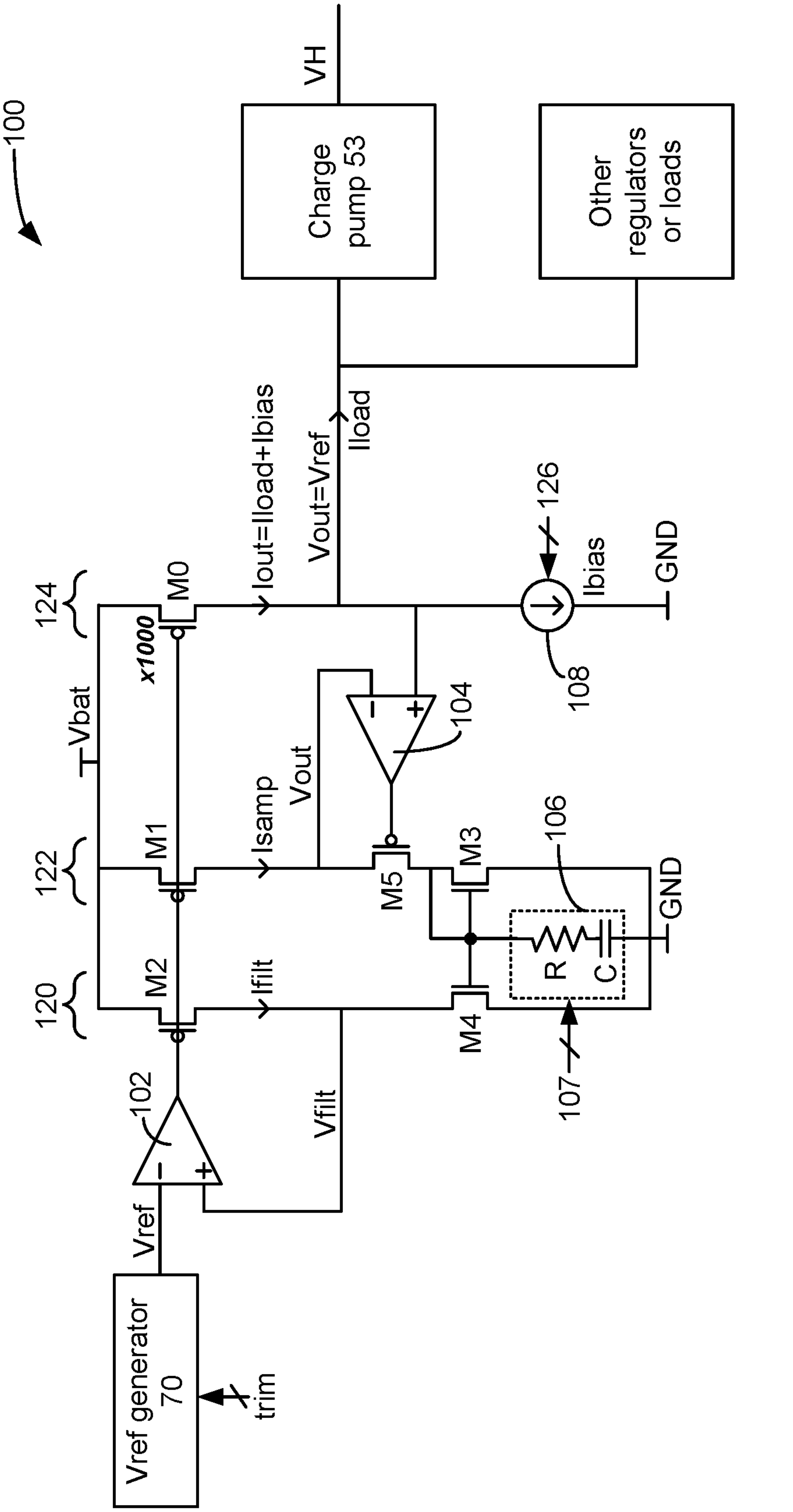

FIGS. 6 and 7 provide other examples of regulator circuit 100, which largely operate similarly to what was described in FIG. 5.

In FIG. 6, Vref is scaled by a diff amp 105 and resistors R1 and R2 to a different value Vref*(R1+R2)/R2, which is input to the negative diff amp 102 described earlier. Vfilt in branch 120 is provided directly to the positive input of diff amp 102 as the control voltage Vctrl. This sets Vout to an ideal value of Vref*(R1+R2)/R2 just as in FIG. 5, with the difference being that the influence of resistors R1 and R2 in setting Vout are switched at the inputs of the diff amp 102.

FIG. 7 lacks resistors R1 and R2. Instead, Vref and Vfilt are provided to the inputs of diff amp 102. This example works similarly to stabilize Vout, but sets Vout ideally to Vref.

Although particular embodiments of the present invention have been shown and described, the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. Circuitry for providing a regulated output voltage from a first voltage, comprising:

an output branch comprising at least one output transistor coupled to the first voltage and outputting the regulated output voltage, wherein the at least one output transistor passes an output current;

a first branch and a second branch each comprising at least one control transistor coupled to the first voltage;

first feedback circuitry configured to set a first current in the first branch, wherein the first current comprises the output current scaled by a scalar;

current mirror circuitry configured to mirror the first current as a second current in the second branch;

filter circuitry configured to filter transients from the second current compared to first current; and second feedback circuitry configured to drive the at least one output transistor and the at least one control transistors in the first and second branches, wherein the second feedback circuitry comprises a first input coupled to a reference voltage and a second input coupled to the second branch.

2. The circuitry of claim 1, further comprising one or more loads powered by the output voltage and configured to draw a load current from the output voltage.

3. The circuitry of claim 2, wherein at least one of the loads comprises a boosting circuit for producing a power supply voltage from the output voltage.

4. The circuitry of claim 3, further comprising stimulation circuitry in a stimulator device, wherein the power supply voltage is configured to power the stimulation circuitry.

5. The circuitry of claim 2, further comprising a current source configured to draw a bias current from the output voltage.

6. The circuitry of claim 5, wherein the output current comprises a sum of the bias current and the load current.

7. The circuitry of claim 1, wherein the first feedback circuitry comprises a first input connected to the output voltage, and a second input connected to an output of the control transistor in the first branch.

8. The circuitry of claim 7, wherein the first branch comprises a feedback transistor, wherein an output of the first feedback circuitry controls the feedback transistor.

9. The circuitry of claim 1, wherein the current mirror circuitry comprises current mirror transistors in the first and second branches having a common gate connected to the first branch.

10. The circuitry of claim 9, wherein the filter circuitry is connected to the common gate connection.

11. The circuitry of claim 1, wherein the scalar is set by an effective width of the at least one output transistor relative to a width of the control transistors.

12. The circuitry of claim 1, wherein the first voltage is provided by a battery.

13. The circuitry of claim 12, further comprising a first resistance and a second resistance, wherein the output voltage comprises a function of the reference voltage, the first resistance and the second resistance.

14. The circuitry of claim 1, wherein the output voltage equals the reference voltage.

15. The circuitry of claim 1, wherein the first and second feedback circuitries each comprise at least one amplifier.

16. The circuitry of claim 1, wherein the at least one output transistor comprises a plurality of transistors connected in parallel.

* * * * *